United States Patent [19]

Schuler

[11] 3,835,358

[45] Sept. 10, 1974

[54] INDUCTIVE CONTROL PULSE GENERATING APPARATUS FOR AN ELECTRIC MACHINE

[75] Inventor: Ulrich Schuler, Berlin, Germany

[73] Assignee: Siemens Aktiengesellschaft, Munich, Germany

[22] Filed: Apr. 18, 1973

[21] Appl. No.: 352,203

[30] Foreign Application Priority Data
May 5, 1972 Germany.......................... 2222912

[52] U.S. Cl................ 318/327, 310/68 R, 310/171
[51] Int. Cl.......................... H02k 11/00, H02p 5/00
[58] Field of Search .......... 318/138, 254, 328, 327, 318/326; 310/171, 68 R, 68 D

[56] References Cited
UNITED STATES PATENTS
3,714,532   1/1973   McCurry............................ 318/254

Primary Examiner—Robert K. Schaefer
Assistant Examiner—Thomas Langer
Attorney, Agent, or Firm—Kenyon & Kenyon Reilly Carr & Chapin

[57] ABSTRACT

An apparatus is provided for generating control pulses for controlling the speed of an electric machine. The apparatus comprises a rotatable, serrated rotor disposed adjacent a stator provided with a plurality of spaced apart teeth on the periphery thereof. A plurality of primary and secondary windings are alternately disposed in a linear arrangement on selected ones of said plurality of said stator teeth, the primary windings being coupled to an excitation signal generator. A selected pair of the secondary windings are coupled to a pair of rectifiers, which rectify signals induced therein and generate the control pulses. These pulses are fed to an electronic amplifier which differentiates the signals to produce sharply defined control pulses.

6 Claims, 3 Drawing Figures

3,835,358

INDUCTIVE CONTROL PULSE GENERATING APPARATUS FOR AN ELECTRIC MACHINE

BACKGROUND OF THE INVENTION

1. Field of the Invention

The invention relates to a signal generating apparatus, and in particular to an inductive pulse generating apparatus for generating a rotor position-dependent control pulses for controlling the speed of an electric machine.

2. Description of the Prior Art

In order to accurately control the speed of electric machines, such as electric motors, by means of thyristors, it is necessary that the generation of the thyristor control pulses accurately correspond to the position of the rotor of the machine. Known devices for generating such control pulses detect changes of the magnetic field generated by the windings of the machine by means of Hall-effect generators, or inductive devices, and convert these field changes into voltage pulses. However, as in the operation of electric machines, interference fields are frequently generated, and much difficulty can be encountered in attempting to control the machine since false control pulses are caused thereby. Correlation of the generation of the control pulses with respect to the position of the rotor to maintain accurate control is thus relatively difficult.

SUMMARY OF THE INVENTION

It is therefore, an object of the invention to provide, in an electric machine, an inductive control pulse generating apparatus for generating control pulses only in response to the position of the rotor of the machine.

It is also an object of the invention to prevent the generation of false control pulses by interference fields in such a pulse generating apparatus.

Accordingly, the invention provides an apparatus for generating control pulses for controlling the speed of an electric machine, such as an electric motor. The apparatus comprises a rotatable, serrated rotor; a stator, disposed adjacent to the rotor, which has a plurality of spaced-apart teeth disposed on the periphery thereof; a plurality of primary and secondary windings, alternately disposed in a linear arrangement on selected ones of the plurality of stator teeth; means coupled to the primary windings, for generating an excitation signal; and means, coupled to a selected pair of the secondary windings, for rectifying signals induced in the secondary windings in response to the excitation signal, and generating the control pulses.

In a preferred embodiment of the invention, a pair of bridge rectifiers are coupled to a selected pair of the secondary windings, which pair of windings are spaced apart by 180 electrical degrees with respect to the pole pitch of the rotor. The pole pitch comprises the combined widths of one of the teeth of the serrated rotor and the gap between adjacent teeth. The secondary windings are preferably disposed on stator teeth which are significantly less in width than the pole pitch of the rotor. The signals rectified by the rectifying means are subtracted, and then differentiated by an electronic amplifier to produce sharply defined control pulses which correspond to the position of the rotor. The control pulses thus obtained have an unambiguous zero crossing, the position of which is dependent only upon the rotor position, and which is furthermore independent of the direction of rotation of the rotor.

BRIEF DESCRIPTION OF THE DRAWINGS

In the drawings, wherein similar reference numerals denote similar elements throughout the several views.

DETAILED DESCRIPTION

Figure 1:
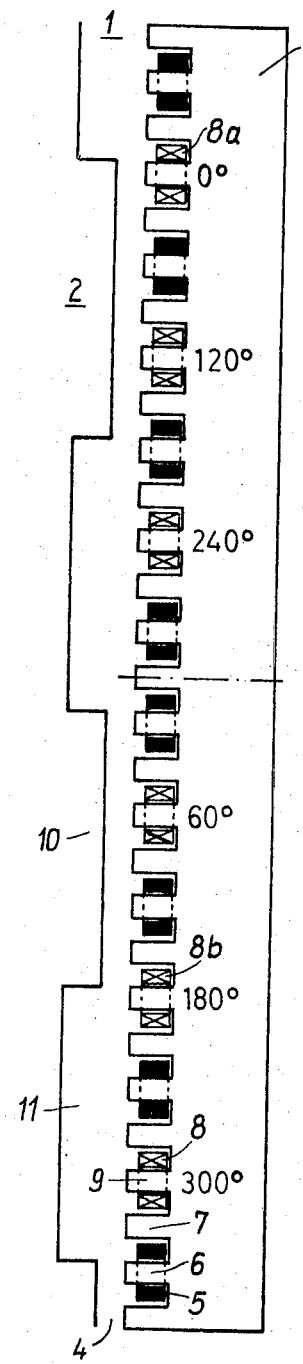
FIG. 1 is a plan view of the rotor and stator of a control pulse generating apparatus constructed according to the invention.

Referring now to the drawings, specifically FIG. 1, there shown a rotatable, serrated rotor 2, which is coupled to the rotor of the electric machine, such as an electric motor, which is to be controlled. A stator 3 is disposed adjacent rotor 2, and is provided with a plurality of spaced-apart teeth along the periphery thereof. Air gap 4 separates rotor 2 from stator 3 and the teeth disposed thereon. The serrated rotor serves to alter the width of air gap 4 as it rotates. A plurality of primary windings 5 are disposed on teeth 6 of stator 3. Secondary windings 8 are disposed between primary windings 5 on teeth 9 of stator 3, so that a linear, alternating arrangement of the primary and secondary windings is provided on the periphery of the stator. Stator teeth 7 are disposed between adjacent primary and secondary windings to separate the windings. The width of each of the stator teeth, may, if desired, be equal. However, the width of the stator teeth on which secondary windings 8 are disposed should be less than, preferably significantly smaller than, the pole pitch of rotor 2, which is made up of the width of one rotor tooth 10 and one rotor tooth gap 11.

Figure 2:
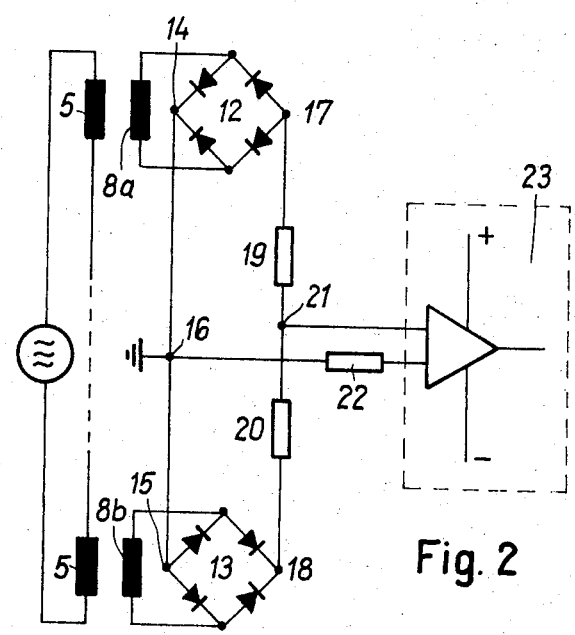
FIG. 2 is a schematic circuit diagram of the pulse generating apparatus constructed according to the invention.

A selected pair of the secondary windings, 8a and 8b, which are spaced apart on the periphery of the stator by 180 electrical degrees with respect to the rotor pole pitch, are used to generate the control pulses. As is shown in FIG. 2, a means for generating an excitation signal, comprising an AC current source, is coupled to primary windings 5 of stator 3. Rectifying means, illustrated as diode bridge rectifiers 12 and 13, are coupled to secondary windings 8a and 8b, and rectify the signals induced therein by the AC excitation signal applied to primary windings 5. Output terminal 14 of rectifier 12 is coupled directly to output 15 of rectifier 13 by a conductor terminal 16. Output 17 of rectifier 12 is coupled by a first resistor 19, a conductor terminal 21, and a second resistor 20, having a resistance equal to that of resistor 19, to output 18 of rectifier 13. Conductor terminals 16 and 21 are coupled, by another resistor 22, and directly, respectively, to a means for differentiating the signals rectified by rectifiers 12 and 13, illustrated as electronic amplifier 23.

Figure 3:
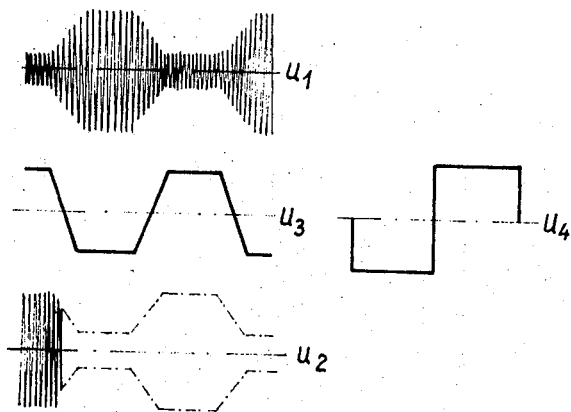
FIG. 3 is a graphical illustration of the voltage signals induced in the secondary windings of the apparatus, and of the control pulses generated by the pulse generating apparatus of the invention.

The operation of the pulse generation apparatus of the invention will now be described with reference to FIG. 3:

The AC current signal generator coupled to primary windings 5 generates a high frequency AC current, which, by means of the electric field created by the windings, induces a modulated voltage signal $U_1$ in secondary winding 8a, and another modulated voltage signal $U_2$ in secondary winding 8b. Both modulated voltage signals vary as a function of the position of rotor 2, and reach their maximum voltage values when a rotor tooth 10 is disposed adjacent either secondary winding 8a or 8b. The signals similarly reach their minimum voltage values when a pole gap 11 of rotor 2 is disposed adjacent either of these secondary windings. The rotating rotor thus serves to modulate the primary winding field and the signals induced in the secondary windings. Voltage signals $U_1$ and $U_2$ are transmitted to bridge rectifiers 12 and 13, respectively, where they are rectified. Outputs 14 and 17 of rectifier 12 are coupled to outputs 15 and 18 of rectifier 13 in order to compare voltage signals $U_1$ and $U_2$, which are 180° out of phase. The signal $U_3$ which appears across conductor terminals 16 and 21 between outputs 14 and 15, and 17 and 18, of rectifiers 12 and 13, respectively, is the difference between the rectified voltage signals appearing at each of the conductor terminals 16 and 21. Voltage signal $U_3$ has an unambiguous zero crossing in the region of the signal voltage rise and decay, i.e., in the region where windings 8a and 8b are passed by a rotor tooth 10, which is independent of the direction of rotation of rotor 2. The smaller the width of teeth 9, over which secondary windings 8a and 8b are disposed, relative to the rotor pole pitch, the steeper is the voltage rise and decay of signal $U_3$. Thus, the region in which the zero crossing of the signal is able to change its position is reduced significantly. Furthermore, since teeth 7, disposed between the primary and secondary windings on the stator, prevent stray fluxes from returning through air gap 4 to the secondary windings of the stator, generation of false pulses is prevented, and the pulses of voltage signal $U_3$ are sharply defined and are associated unambiguously with the instantaneous position of rotor 2 of the pulse generating apparatus 1. Voltage signal $U_3$ is transmitted from conductor terminals 16 and 21 to amplifier 23, which differentiates signal $U_3$ to produce a sharply defined, rectangular shaped pulses which form the voltage signal $U_4$.

With the pulse generating apparatus of the invention, it is possible, by properly designing stator 3, to tap off simultaneously several pulses which are inter-related to each other by a definite electrical angle. For example, the embodiment of stator 3 illustrated in FIG. 1 generates three pulses simultaneously which are mutually displaced by 120 electrical degrees. These three pulses may be used to control an electrical motor controlled by a three-phase thyristor system. Through similar simple modifications of the stator construction, any desired number of simultaneous pulses may be generated for meeting particular control requirements.

While there has been disclosed herein a preferred embodiment of the invention, it will be obvious to those persons skilled in the art that various changes and modifications may be made thereunto without departing from the invention, and it is therefore intended in the appended claims to cover all such changes and modifications as fall within the true spirit and scope of the invention.

What is claimed is:

1. In an electric machine, an apparatus for generating control pulses for controlling the speed thereof, comprising:
   a rotatable, toothed rotor of a predetermined pole pitch;
   a stator, disposed adjacent said rotor, having a plurality of spaced-apart stator teeth disposed on the periphery thereof;
   a plurality of primary windings disposed on first selected ones of said plurality of stator teeth;
   supply means for supplying an excitation signal to said primary windings;
   a plurality of secondary windings disposed on corresponding ones of a second selected ones of said stator teeth between selected ones of said primary windings, said secondary windings being spaced-apart by 180 electrical degrees with respect to said pole pitch of said rotor; and
   means, coupled to a selected pair of said secondary windings, for rectifying signals induced in said secondary windings in response to said excitation signal and generating the control pulses.

2. The apparatus as recited in claim 1, wherein said rotor includes a plurality of spaced-apart teeth disposed on the periphery thereof separated by a selected gap, the width of said stator teeth on which said secondary windings are disposed being significantly less than the pole pitch of said rotor, said pitch comprising the combined widths of said gap and one of said rotor teeth.

3. The apparatus as rectied in claim 1, wherein said rectifying means comprises a pair of bridge rectifiers coupled to said selected pair of secondary windings.

4. The apparatus as recited in claim 3, wherein said rectifying means further comprises means, coupled to said rectifiers, for differentiating the signals rectified thereby.

5. The apparatus as recited in claim 4, wherein said signal differentiating means comprises an amplifier, coupled to the output terminals of said rectifiers.

6. The apparatus as rectied in claim 1, wherein at least one of said stator teeth is disposed between each adjacent pair of primary and secondary windings.

* * * * *